US012770203B2

(12) United States Patent
Sankey

(10) Patent No.: US 12,770,203 B2
(45) Date of Patent: Oct. 20, 2026

(54) SYSTEM AND METHOD FOR REAL ESTATE DEVELOPMENT AND CONSTRUCTION COST AND RISK MANAGEMENT

(71) Applicant: Northspyre, Inc., Brooklyn, NY (US)

(72) Inventor: William Sankey, Atlanta, GA (US)

(73) Assignee: Northspyre, Inc., Brooklyn, NY (US)

( * ) Notice: Subject to any disclaimer, the term of this patent is extended or adjusted under 35 U.S.C. 154(b) by 0 days.

(21) Appl. No.: 19/264,015

(22) Filed: Jul. 9, 2025

(65) Prior Publication Data

US 2025/0336016 A1 Oct. 30, 2025

Related U.S. Application Data

(63) Continuation of application No. 16/138,009, filed on Sep. 21, 2018, now Pat. No. 12,373,903.

(Continued)

(51) Int. Cl.

*G06Q 50/163* (2024.01)
*G06Q 40/08* (2012.01)
*G06Q 40/12* (2023.01)

(52) U.S. Cl.

CPC ........... *G06Q 50/163* (2013.01); *G06Q 40/08* (2013.01); *G06Q 40/12* (2013.12)

(58) Field of Classification Search

CPC ...... G06Q 20/102; G06Q 10/06; G06Q 30/04; G06Q 50/163

See application file for complete search history.

(56) References Cited

U.S. PATENT DOCUMENTS 7,546,268 B1 6/2009 DiGiovanni et al.
7,707,153 B1 * 4/2010 Petito .................... G06Q 10/10 707/999.101

(Continued)

OTHER PUBLICATIONS

Y. Kurniawan, M. Karsen, A. vin Adiprasetyo, H. Juwitasary and D. F. C. Tapia, "Accounting information systems implementation: (A case study approach)," 2017 International Conference on Information Management and Technology (ICIMTech), Special Region of Yogyakarta, Indonesia, 2017, pp. 294-299 (Year: 2017).*

(Continued)

*Primary Examiner* — Maria C Santos-Diaz
(74) *Attorney, Agent, or Firm* — MARSHALL, GERSTEIN & BORUN LLP

(57) ABSTRACT

A real estate development and construction cost and risk management system is disclosed. The real estate development and construction cost and risk management system has a real estate development and construction cost and risk management module, comprising computer-executable code stored in non-volatile memory, a processor, and a communication device. The real estate development and construction cost and risk management module, the processor, and the communication device are configured to receive an invoice data flow, receive a commitments data flow, receive a budget transactions data flow, extract data from the invoice data flow, the commitments data flow, and the budget transactions data flow, update a data set using the data extracted from the invoice data flow, the commitments data flow, and the budget transactions data flow, and generate a plurality of reports based on the updated data set.

17 Claims, 7 Drawing Sheets

Related U.S. Application Data

(60) Provisional application No. 62/564,099, filed on Sep. 27, 2017.

(56) References Cited

U.S. PATENT DOCUMENTS

| | | | | |
|---|---|---|---|---|
| 10,019,740 | B2 | 7/2018 | Simantov et al. | |
| 10,509,799 | B2 | 12/2019 | Woodings et al. | |
| 10,817,647 | B1 | 10/2020 | Johnson et al. | |
| 11,068,544 | B2 | 7/2021 | Kudryavtsev et al. | |
| 12,014,309 | B1 | 6/2024 | Li et al. | |
| 2007/0260535 | A1 * | 11/2007 | Kontogiannis | G06Q 40/03 705/38 |
| 2010/0138354 | A1 | 6/2010 | Lawrence | |
| 2012/0158561 | A1 * | 6/2012 | Gannon | G06Q 40/06 705/30 |
| 2014/0222469 | A1 * | 8/2014 | Stahl | G06Q 40/08 705/4 |
| 2018/0144314 | A1 | 5/2018 | Miller | |
| 2018/0173681 | A1 * | 6/2018 | Dedhia | G06F 16/583 |
| 2018/0218344 | A1 | 8/2018 | Bahnub et al. | |
| 2019/0079913 | A1 | 3/2019 | Levine et al. | |

OTHER PUBLICATIONS

Kosovac, B. A framework for managing information from heterogeneous, distributed, and autonomous sources in the architecture, engineering, contruction and facilities management domain (2007).

Read, N. Understanding the impact of virtual mirroring-based learning on collaboration in a data and analytics function: A resilience perspective (Order No. 10982324) (2019).

* cited by examiner

SYSTEM AND METHOD FOR REAL ESTATE DEVELOPMENT AND CONSTRUCTION COST AND RISK MANAGEMENT

RELATED APPLICATIONS

This application is a continuation of U.S. nonprovisional patent application Ser. No. 16/138,009, entitled "System and Method for Real Estate Development and Construction Cost and Risk Management," filed Sep. 21, 2018, which claims the benefit of U.S. provisional patent application 62/564,099 filed Sep. 27, 2017, which is hereby incorporated by reference in its entirety.

FIELD OF THE INVENTION

The present invention generally relates to a system and method for providing real estate development and construction cost and risk management. For example, embodiments of the present invention are directed to providing systems and methods of aggregating, synchronizing and modeling data associated with real estate development and construction projects in order to provide tools to reduce errors and administrative burdens on real estate developers. Also for example, embodiments of the present invention may integrate data into decision-making processes.

BACKGROUND

Real estate development and construction companies generally use basic tools, such as spreadsheets, and other simple models that often serve discrete purposes. There is typically no harmonization, synchronization or other error management processes between these discrete processes and purposes. This leaves these companies ripe for creating duplicate data entries and other errors in reported data.

Some companies use on-premise accounting software, but such software usually fails to "think" like a project manager or an investor and involves staffing of high-wage accountants or consultants to follow up to confirm that the software is used and utilized correctly in order to ensure entries are correct and accounting is done properly.

There is a need in the art for a system and method for providing complex models for the real estate development and management field without the need to build individual spreadsheet models or other models for each specific instance. Further, there is a need in the art for a system and method for automatically identifying and correcting accounting errors and other data errors, while allowing for multiple users to work contemporaneously with one another. Also, decisions and negotiation stances are typically made without access to relevant data, unless such relevant data is timely provided based on manual collection and manual analysis. These and other features and advantages of the present invention will be explained below.

The exemplary disclosed system, apparatus, and method of the present disclosure is directed to overcoming one or more of the shortcomings set forth above and/or other deficiencies in existing technology.

SUMMARY OF THE DISCLOSURE

In one exemplary aspect, the present disclosure is directed to a real estate development and construction cost and risk management system. The real estate development and construction cost and risk management system includes a real estate development and construction cost and risk management module, comprising computer-executable code stored in non-volatile memory, a processor, and a communication device. The real estate development and construction cost and risk management module, the processor, and the communication device are configured to receive an invoice data flow, receive a commitments data flow, receive a budget transactions data flow, extract data from the invoice data flow, the commitments data flow, and the budget transactions data flow, update a data set using the data extracted from the invoice data flow, the commitments data flow, and the budget transactions data flow, and generate a plurality of reports based on the updated data set.

In another aspect, the present disclosure is directed to a method. The method includes receiving an invoice data flow, receiving a commitments data flow, receiving a budget transactions data flow, and extracting data from the invoice data flow, the commitments data flow, and the budget transactions data flow. The method also includes determining data inconsistencies, correcting data inconsistencies, and updating a data set using the data extracted from the invoice data flow, the commitments data flow, and the budget transactions data flow. The method further includes generating a plurality of reports based on the updated data set.

DETAILED DESCRIPTION AND INDUSTRIAL APPLICABILITY

Figure 1:
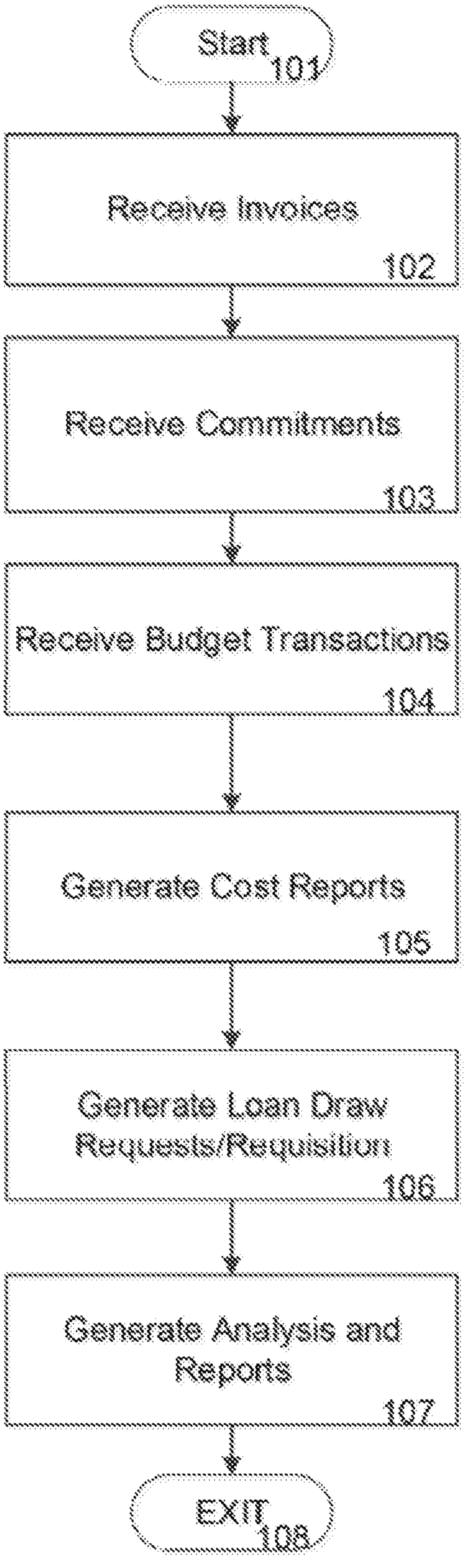
FIG. 1 illustrates an exemplary process flow for providing real estate development and construction cost and risk management.

The present invention generally relates to a system and method for providing real estate development and construction cost and risk management. For example, at least some exemplary embodiments of the present invention are directed to providing systems and methods of aggregating, synchronizing and modeling data associated with real estate development and construction projects in order to provide tools to reduce errors and administrative burdens on real estate developers. By presenting information with key performance indicators and insights for a given project that goes beyond a pure accounting exercise, the invention provides a more robust analysis that can enhance and better guide the decision-making process, including by providing specific insights into the project and vendor performance.

In at least some exemplary embodiments, the exemplary disclosed system and method presents information that includes key performance indicators and insights for a project that may for example encompass more than accounting processes. For example, the information may be used in and may support project decision-making processes.

In at least some exemplary embodiments of the present invention, the system is provided by way of a cloud-based tool that helps real estate developers, their financial partners (e.g., construction lenders, investors), and project management teams to produce various reports and analyses used to manage design and construction projects from inception through completion.

According to at least some embodiments of the present invention, the system leverages data related to managing cost and project finances to orchestrate and better inform participants involved in the entire processes of building construction and land development. At least some exemplary embodiments of the present invention empower construction managers, real estate developers, and their financial partners to make fewer cost accounting mistakes, glean actionable insights into construction project risks and opportunities, and spend more time running projects instead of dealing with administrative and accounting paperwork.

According to at least some embodiments of the present invention, the system is configured to prevent data fragmentation across various different functions from accounting, project management, investor/financial partner reports, systems, and spreadsheet models. For example, the system may be configured to reconcile data updates and reports across various job function areas, irrespective of differences in reporting methods or standards used by those various job function areas and regardless of the specific data points relied upon by each job function area. Further, embodiments of the present invention provide for multiple people to be able to work on the same reports and at the same time. In at least some exemplary embodiments, the system is configured to produce the appropriate reports for each job function area based on three (3) core flows (e.g., streams) of data: (1) invoices, (2) commitments/contracts/exposures, and (3) budget transactions (e.g., as well as additional or secondary flows (e.g., streams) of data. For example, secondary flows (e.g., streams) of data may include certificates of liability insurance and/or other insurance coverage for project vendors, lien waivers, and/or tax documents such as W-9 forms or other suitable documents). It is also contemplated that the exemplary secondary flows (e.g., streams) of data may also be core flows of data, and that the exemplary core flows (e.g., streams) of data may be secondary flows of data. In at least some exemplary embodiments, a logic layer is able to use the three (3) exemplary core data flows (e.g., streams) to generate a variety of different reports. For example, because the underlying data flow (e.g., data stream) may be the same for any report, any update to the three (3) core data flows (e.g., data streams) may be propagated to any report, therefore automatically keeping all of the reports in sync across all of the job function areas. One of ordinary skill in the art would appreciate that the number of core data flows (e.g., data streams) could be manipulated in order to address alternate and/or additional data sources in order to provide different or more detailed reports, and embodiments of the present invention are contemplated for use with any type of data flow type (e.g., data stream type).

In at least some embodiments of the present invention, the exemplary disclosed system and method provides reporting based on granular data contained in information received from invoices, commitments (e.g., contractual information and obligations, exposure, and other information related to liabilities), and budget transactions. The exemplary system may process these flows (e.g., streams) of data to produce a variety of different desired reports. Because the underlying data flow (e.g., data stream) supporting various reports may be the same, the produced reports may remain consistent (e.g., remain in sync) with each other. When one or more given reports is updated, the underlying data supporting the reports may be updated. Accordingly, updating one report may result in substantially all reports being updated, as substantially all reports may draw from the same underlying data. The exemplary disclosed system may thereby maintain consistent reporting across functional groups.

According to at least some embodiments of the present invention, the system contains models for use in and optimized for construction and land development processes. Having the system integrated with these models may prevent errors associated with building custom spreadsheet models for each new project.

According to at least some embodiments of the present invention, the system identifies and corrects duplicate data entries, to ensure that data is accurate and unique. In at least some exemplary embodiments, when data is entered (e.g., extracted by the system to be entered into the system), the system is configured to review the entire database of project-related transactions to determine whether any of the already entered transactions include information that matches the newly extracted data. This matching may be done by comparing invoice amounts, invoice numbers, and other unique identifying keys using both Boolean comparison and regular expressions to search for patterns and matches. In at least some exemplary embodiments, data may be provided to the exemplary disclosed system via a data extraction process. For example, the exemplary disclosed system may operate to significantly minimize or substantially eliminate data entry by an end user.

According to at least some embodiments of the present invention, the system may extract data (e.g., from the exemplary flows or streams of data disclosed for example herein) by any suitable technique or combination of techniques. The system may infer information about the exemplary flows or streams of data (e.g., invoice and/or commitments such as contracts and proposals). For example, the system may infer a vendor name based on a sender's email address from which a given document has been attached and sent (e.g., and received by the system). Also, the system may analyze historical patterns and utilize extrapolation. For example, the system may identify an invoice budget line based on data (e.g., a data set) collected for a given vendor. Further, if the system cannot identify given information, the system may prompt a user of the system to provide clarification. For example, if "Bob's Construction" has been identified by the system as a vendor, and "Robert's Construction" also exists within one or more project's data set, the system may clarify by prompting the user for clarification (e.g., by asking a user "Is Bob's Construction an alias for Robert's Construction?"). Once provided with a response to such an exemplary prompt by the user, the system may update one or more data sets accordingly (e.g., for the given example, the system would know the alias moving forward). Additionally, the system may use optical character recognition (OCR) and associated processes using OCR to extract data. Also for example, the system may use image recognition processes (e.g., image recognition processes utilizing machine learning processes). Further, the system may incorporate human information and data entry as suitable (e.g., in situations in which machine learning and artificial intelligence may not be able to complete certain tasks). For example, the system may prompt a user or a platform (e.g., such as a "mechanical Turk" platform or other suitable network or application that may be used to provide human validation) to provide human validation (e.g., and/or data entry, extraction, and/or confirmation) when the system is unable to establish accurate and/or reliable data extraction or inferencing.

According to at least some embodiments of the present invention, the system may use data models, historical data and training methods to provide empirical instant data around real estate development, design and construction costs for various types of projects or portions of projects. The system may pull and utilize costs data from one or more of a variety of sources, such as from a company's portfolio, anonymized and/or aggregated cost data, vendor and/or project data, or any combination thereof. Such cost data may be further refined for a given metropolitan area, geographical zone, or any combination thereof. Further, cost data may be filtered or narrowed by other key metric, such as by date.

According to at least some embodiments of the present invention, the system may be configured to provide a vendor discovery technique based at least in part on one or more factors, such as business networks, verified vendor prospective, verified historical performance, or any combination thereof. One of ordinary skill in the art would appreciate that there are numerous factors that could be utilized, and embodiments of the present invention are contemplated for use with any appropriate factor.

According to at least some embodiments of the present invention, the system is configured to generate and organize data pulled from existing data files (e.g., PDF files, Word files, and Excel models). The system may be further configured to organize the documentation in an organized and logical manner that can be accessed from different functional purposes and displayed appropriately for the purpose.

According to at least some embodiments of the present invention, the system is configured to produce data and reports using complex programmatic logic and data modeling underpinned by a modelled data input. As such, the system is configured to generate anticipated cost reports, loan draw requests/requisition, overview and analysis of all vendors on a project, summaries of invoices, proposals, and several other reports with limited input data feeds. For example, the exemplary disclosed system and method may provide for portions of a construction loan to be disbursed based on the completion of given construction tasks or milestones. For example, the exemplary disclosed system and method may provide for (e.g., provide support for) releases of portions (e.g., "draws") of construction loan proceeds based on data flows (e.g., data streams) processed by the system. For instance, in at least some exemplary embodiments of the present invention, the system may calculate, generate and provide most if not all reports from three major input data feeds: invoices, commitments (contracts/proposals), and budget transactions. The system is able to use these data points for generating a set of data that can be leveraged and cross-referenced to generate the requested reports. Furthermore, depending on the report type, the algorithms of the system may utilize experiential data from sources with expertise in real estate development and construction to translate the core model transactions (e.g., invoices, commitments/exposures, and budget revision) to generate the tailored reports, whether for investors, financial partners (e.g. construction lenders), internal management, outside vendor management, and other parties involved in the design, development and construction process.

The exemplary disclosed system and method may provide an efficient system that is faster and less burdensome than a process of using hours of human data entry, followed by report creation, error checking, analysis, and decision-making. The exemplary disclosed system and method may generate reports instantaneously (e.g., in real-time or near real-time) based on the exemplary flows (e.g., streams) of data disclosed for example herein, thereby proceeding immediately (e.g., or almost immediately after providing minimal commands to the system) to decision-making.

According to at least some embodiments of the present invention, the system is configured to utilize a simplified data model, coupled with complex logic as an intermediator, to allow for a simple user experience and user interface, despite underlying complexity of reporting and management information created. As such, inexperienced users are able to utilize portions of the system, such as data entry and role specific tasks (e.g., requesting accounting reports) and the system is able to generate complicated or otherwise detailed reports and management information based on these simple inputs. In at least some exemplary embodiments, the system utilizes data inputs comprising invoices, commitments (e.g. proposals, contracts, and purchase orders), and budget transactions that are sufficiently simple, yet adequately distinct for the system to receive the information via an electronic communication system (e.g. email) and sort the information into the three (3) exemplary input categories (e.g., or any other suitable category as disclosed for example herein). Through the sorting process, the sorted data can be automatically entered into the corresponding fields of the various output documents of the various report types. In at least some exemplary embodiments, a user may approve or reject the data input, after which the data is synchronized, with any updates being automatically pushed through to all report types without any further action or duplicated efforts by the user (e.g., entering the same information in any number of different reports), unless for example the user desires to make minor modifications in a particular circumstance.

According to at least some embodiments of the present invention, the system is configured to provide cost inbox features that allow for the processing, sorting and inclusion of some or substantially all files and data received via an electronic communications device, such as, but not limited to, email, text, SMS, application programming interface (API), or any combination thereof. For instance, email received directly from a user's received (or forwarded) emails can be organized automatically by the system and attachments thereto may be processed for data inclusion into the system. In alternative embodiments, the system may allow for inclusion of data and attachments in electronic communications device to be limited in various manners, such as only included upon approval by a user (e.g., user input). This solves the problem of users receiving hundreds of emails with attachments (e.g., PDF attachments of invoices and proposals), which could involve manual saving and organizing of those files so they are accessible to different parties involved in a project.

According to at least some embodiments of the present invention, the system is configured to create reports in a variety of file formats. In at least some exemplary embodiments, suitable file formats for the reports include, but are not limited to, Adobe® Portable Document Format (PDF) or spreadsheet (e.g. Microsoft® Excel®). In addition or as an alternative to the file formats mentioned above, the reports could be shared via the internet via shareable private links. In at least some exemplary embodiments, the link can be restricted based on certain parameters, for example requisition period or month. In some embodiments, the link provides access to a digital, web-browser-based dashboard and reporting hub, wherein data and reports accessible via said link may be restricted to the parameters set by the link creator. In at least some exemplary embodiments, the system is configured to collate the various reports types into one complete report file. Furthermore, due to the unique synchronization across report types, the complete report can be easily re-collated when updates are inputted to any of the reports.

According to at least some embodiments of the present invention, the system is configured to automatically check project finances for errors and key issues that would affect a project (e.g., budget overruns, vendor involvement with contracts). For instance, in at least some exemplary embodiments, the system may be configured to review data for duplicates or out-of-place entries. Duplicate entries could be removed or flagged for review by the system. Out-of-place entries may be trained in the system through various artificial intelligence or machine learning techniques. For instance, the system may monitor corrections provided by users and predict and present errors to users for review. After numerous successful predictions and approvals by users, the system may be appropriately trained to identify and automatically process anomalies with a high level of accuracy. One of ordinary skill in the art would appreciate that there are numerous types of machine learning, modelling, training and heuristics that could be utilized with embodiments of the present invention, and embodiments of the present invention are contemplated for use with any appropriate machine learning and artificial intelligence techniques.

According to at least some embodiments of the present invention, the system is configured to incorporate concurrent usage techniques, such as transactions and data integrity models to allow multiple users to work on a single project at the same time and have the data instantly update across some or substantially all reporting activities and functions.

According to at least some embodiments of the present invention, the system is configured to provide users the ability to create new projects quickly by leveraging existing data and extrapolating and carrying over data from previous projects and general market data collected (e.g., aggregated data) in order to quickly fill in new project data. For instance, in at least some exemplary embodiments of the present invention, the system may pull in and utilize information and materials from previous projects, such as company information, organizational information, investor information, vendor information, accounting information and other forms of information or combinations thereof.

Turning now to FIG. 1, an exemplary process flow for processing information and generating reports, in accordance with at least some embodiments of the present invention, is shown. The process starts at step 101 with the system being engaged for processing and generation of information and reports.

At step 102, the system receives invoices from one or more users via one or more electronic communication devices. Invoices are related to projects and may be identified and organized as detailed herein. Association with a project may be identified in various manners, such as via metadata associated with the data provided, based on user identification, based on project identification, based on invoicing company or vendor, or any combination thereof. One of ordinary skill in the art would appreciate that there are numerous types of metadata that could be utilized, and embodiments of the present invention are contemplated for use with any type of metadata. After receipt, the system will process the information in the invoices and associate the data therein with the appropriate project.

At step 103, the system receives commitments from one or more users via one or more electronic communications devices. Commitments are related to projects and may be identified and organized as detailed herein. Association with a project may be identified in various manners, such as via metadata associated with the data provided, based on user identification, based on project identification, based on company or vendor associated with the commitment, or any combination thereof. One of ordinary skill in the art would appreciate that there are numerous types of metadata that could be utilized, and embodiments of the present invention are contemplated for use with any type of metadata. After receipt, the system will process the information in the commitments and associate the data therein with the appropriate project.

At step 104, the system receives budget transactions from one or more users via one or more electronic communications devices. Budget transactions may be related to projects and may be identified and organized as detailed herein. Association with a project may be identified in various manners, such as via metadata associated with the data provided, based on user identification, based on project identification, based on company or vendor associated with the business transaction, or any combination thereof. One of ordinary skill in the art would appreciate that there are numerous types of metadata that could be utilized, and embodiments of the present invention are contemplated for use with any type of metadata. After receipt, the system will process the information in the budget transactions and associate the data therein with the appropriate project.

At step 105, the system uses the processed information to generate one or more cost reports. Cost reports may include and incorporate data received and associated with the processed invoices, commitments, budget transactions, or any combination thereof. In certain embodiments, the reports may be automatically generated upon trigger events, such as exceeding a threshold, elapsing of a time period, or any other trigger event. One of ordinary skill in the art would appreciate that there are numerous trigger events that could be utilized, and embodiments of the present invention are contemplated for use with any trigger event. Cost reports may also be manually generated upon request.

At step 106, the system uses the processed information to generate one or more loan draw requests. Loan draw requests may include and incorporate data received and associated with the processed invoices, commitments, budget transactions, or any combination thereof. In certain embodiments, the loan draw requests may be automatically generated upon trigger events, such as exceeding a threshold, available capital and working capital requirements, elapsing of a time period, or any other suitable trigger event. One of ordinary skill in the art would appreciate that there are numerous trigger events that could be utilized, and embodiments of the present invention are contemplated for use with any trigger event. Loan draw requests may also be manually generated upon request.

At step 107, the system uses the processed information to generate one or more reports. Reports may include and incorporate data received and associated with the processed invoices, commitments, budget transactions, or any combination thereof. In certain embodiments, the reports may be automatically generated upon trigger events, such as exceeding a threshold, elapsing of a time period, or any other trigger event. One of ordinary skill in the art would appreciate that there are numerous trigger events that could be utilized, and embodiments of the present invention are contemplated for use with any trigger event. Reports may also be manually generated upon request. At this point, the process terminates at step 108.

Figure 2:
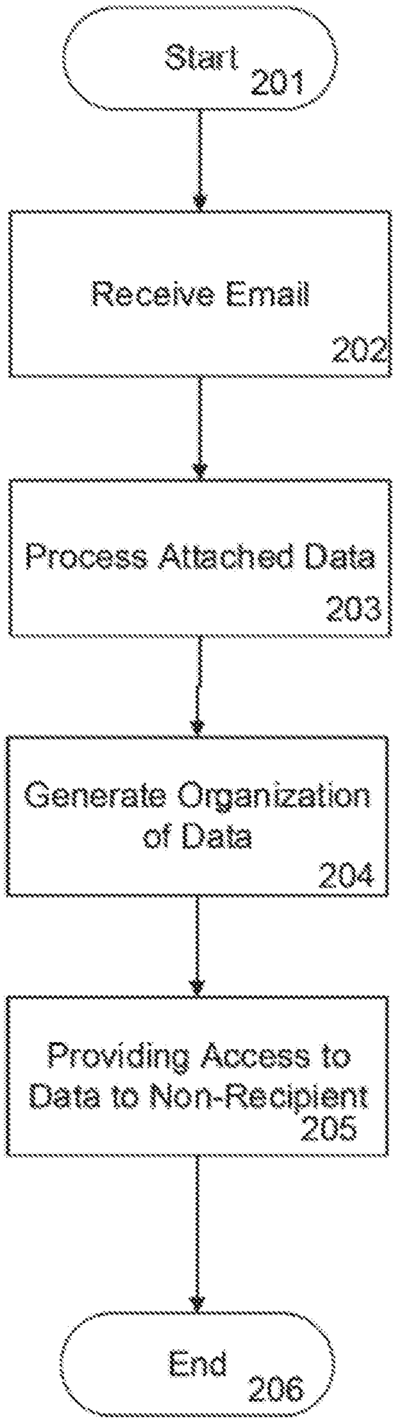
FIG. 2 illustrates an exemplary process flow for providing real estate development and construction cost and risk management.

Turning now to FIG. 2, an exemplary process flow for processing electronic communications from electronic communications devices, and processing updates, in accordance with at least some embodiments of the present invention, is shown. In this exemplary process flow, email is used as the electronic communications technique, but the process could be used in similar manner for other electronic communications devices and/or techniques as well. The process starts at step 201 with the system being engaged for processing of one or more electronic communications techniques (e.g., emails).

At step 202, the system receives email from one or more users, containing one or more attachments or other data to be processed and incorporated into project data for usage with a particular project. As noted herein, the email could be received in numerous manners, including, but not limited to, directly from users inboxes, or forwarded to the system by users.

At step 203, the system processes the attached data for usage in the project data. Processing of the data may include, but is not limited to, identifying the associated project, identifying the providing user, validating the providing user, identifying the sender, validating the sender, and/or identifying and associating data points to the appropriate data element associated with the data point (e.g., invoice amounts, due dates, project status updates).

At step 204, once the attached data has been processed, the system will organize and assign the data to the appropriate locations and projects. For instance, invoices, accounting information, and other data points may be stored in particular folders or other organizational elements, and data points associated with the appropriate project information in a data store, such as a database for consumption with the project.

At step 205, the system generates associations for the data and makes the processed data available to relevant users that may be users other than the provider. For instance, user data that was provided related to accounting information (e.g., an invoice) may be viewable and consumable by accounting personnel assigned to the project. Once the data is appropriately made available, the process may terminate at step 206.

Figure 3:
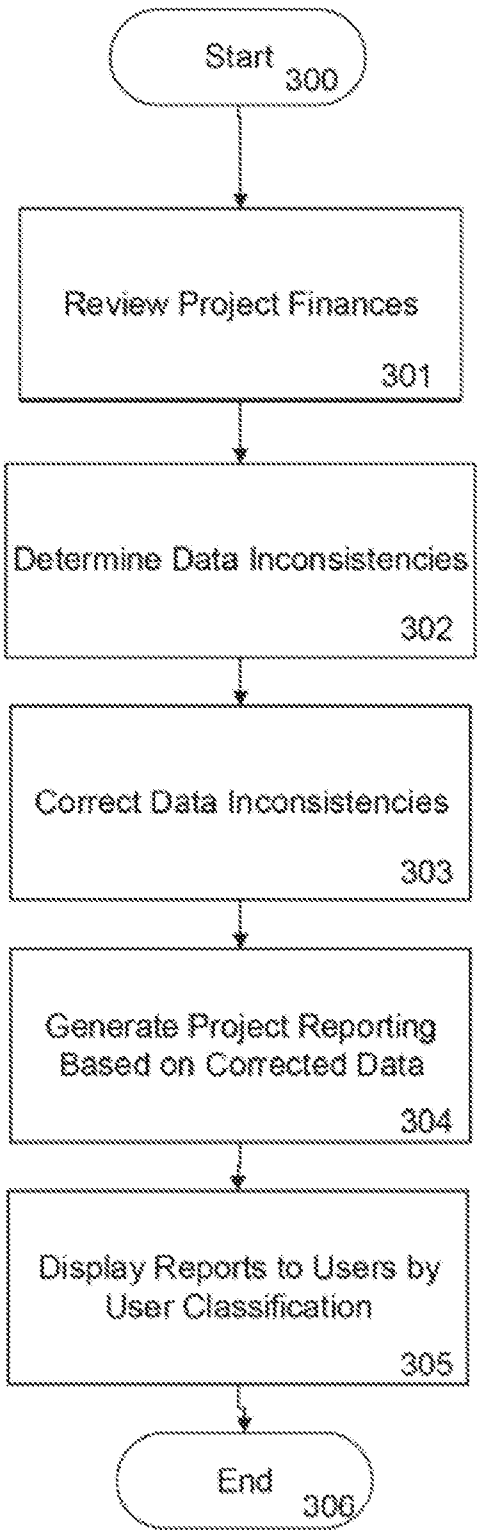
FIG. 3 illustrates an exemplary process flow for providing real estate development and construction cost and risk management.

Turning now to FIG. 3, an exemplary process flow for identifying and processing data inconsistencies, in accordance with at least some embodiments of the present invention, is shown. The process starts at step 300 with the system being engaged to identify and process data inconsistencies. Such engagement may occur automatically, or manually (e.g., if requested by users).

At step 301, the system reviews project finances. In this step, the system may retrieve and begin review of project finances for one or more projects.

At step 302, the system determines data inconsistencies. As noted previously herein, this may be done by one or more artificial intelligence or machine learning methods, wherein the system may identify inconsistent data, such as duplicate entries or entries that are out of place or raise other flags for the type of data reviewed.

At step 303, the system corrects data inconsistencies. The system may use methods for correcting inconsistencies as disclosed for example above. For instance, the system may remove duplicate entries, flag inconsistent data for review by users, remove inconsistent data, correct data flaws and errors, or any combination thereof. One of ordinary skill in the art would appreciate that there are numerous methods that could be utilized by the system for correcting data inconsistencies, and embodiments of the present invention are contemplated for use with any appropriate method for correcting data inconsistencies.

At step 304, the system generates project reporting as required. Project reporting may include, but is not limited to, updating existing reports that were based on previously incorrect data (this may include notifying appropriate users, such as users working on or associated with such reports), and generating alerts and updated reports based on the newly corrected information.

At step 305, the system is configured to provide and display reports to users for example as requested or based on predetermined criteria. Once complete, the process terminates at step 306.

In at least some exemplary embodiments, the exemplary system includes a real estate development and construction cost and risk management module having computer-executable code stored in non-volatile memory, a processor, and a communication device. The real estate development and construction cost and risk management module, the processor, and the communication device may be configured to receive an invoice data flow, receive a commitments data flow, receive a budget transactions data flow, extract data from the invoice data flow, the commitments data flow, and the budget transactions data flow, update a data set using the data extracted from the invoice data flow, the commitments data flow, and the budget transactions data flow, and generate a plurality of reports based on the updated data set. Extracting the data from the invoice data flow, the commitments data flow, and the budget transactions data flow may include identifying project identification data and associating the extracted data with a project based on the project identification data. Extracting the data from the invoice data flow, the commitments data flow, and the budget transactions data flow may also include inferring information using a technique selected from the group consisting of analyzing historical patterns, utilizing extrapolation, prompting a user to provide clarification, using optical character recognition, and using image recognition utilizing machine learning. The commitments data flow may include contractual information. The plurality of reports may include a first report and a second report, and updating a first data of the first report may cause an update of second data of the second report. The first data and the second data may be equal to a same data of the data set. The real estate development and construction cost and risk management module, the processor, and the communication device may be configured to receive a data flow including information selected from the group consisting of a certificate of liability insurance, a lien waiver, and a tax document. Extracting the data from the invoice data flow, the commitments data flow, and the budget transactions data flow may include using both Boolean comparison and regular expressions to search for patterns and matches. Receiving the invoice data flow, the commitments data flow, and the budget transactions data flow may include using the communication device to receive data included in a data packet selected from the group consisting of an email, a text, an SMS, and an application programming interface. The real estate development and construction cost and risk management module, the processor, and the communication device may be configured to generate one or more loan draw requests. The loan draw request may be automatically generated based upon a trigger event selected from the group consisting of exceeding a threshold value, available capital and working capital requirements, and elapsing of a time period.

In at least some exemplary embodiments, the exemplary method may include receiving an invoice data flow, receiving a commitments data flow, receiving a budget transactions data flow, extracting data from the invoice data flow, the commitments data flow, and the budget transactions data flow, and determining data inconsistencies. The exemplary method may also include correcting data inconsistencies, and updating a data set using the data extracted from the invoice data flow, the commitments data flow, and the budget transactions data flow. The method may additionally include generating a plurality of reports based on the updated data set. The data inconsistencies may include duplicate entries. Determining data inconsistencies may include using artificial intelligence or machine learning techniques to identify entries that are out of place in the data set. Correcting data inconsistencies may include actions selected from the group consisting of removing duplicate entries, flagging inconsistent data for review by users, removing inconsistent data, and correcting data flaws and errors. The exemplary method may also include updating the plurality of reports based on the corrected data inconsistencies.

In at least some exemplary embodiments, the system may include a real estate development and construction cost and risk management module having computer-executable code stored in non-volatile memory, a processor, and a communication device. The real estate development and construction cost and risk management module, the processor, and the communication device may be configured to receive an invoice data flow via email, receive a commitments data flow via email, receive a budget transactions data flow via email, extract data from the invoice data flow, the commitments data flow, and the budget transactions data flow, update a data set using the data extracted from the invoice data flow, the commitments data flow, and the budget transactions data flow, and generate a plurality of reports based on the updated data set. The real estate development and construction cost and risk management module, the processor, and the communication device may be configured to identify an email sender and validate the email sender. The real estate development and construction cost and risk management module, the processor, and the communication device may be configured to identify the email sender based on text included in the sender's email address. The real estate development and construction cost and risk management module, the processor, and the communication device may be configured to associate the extracted data with a project based on information selected from the group consisting of a sender's email address, email metadata, text included in the email, and an attachment attached to the email.

Figure 4:
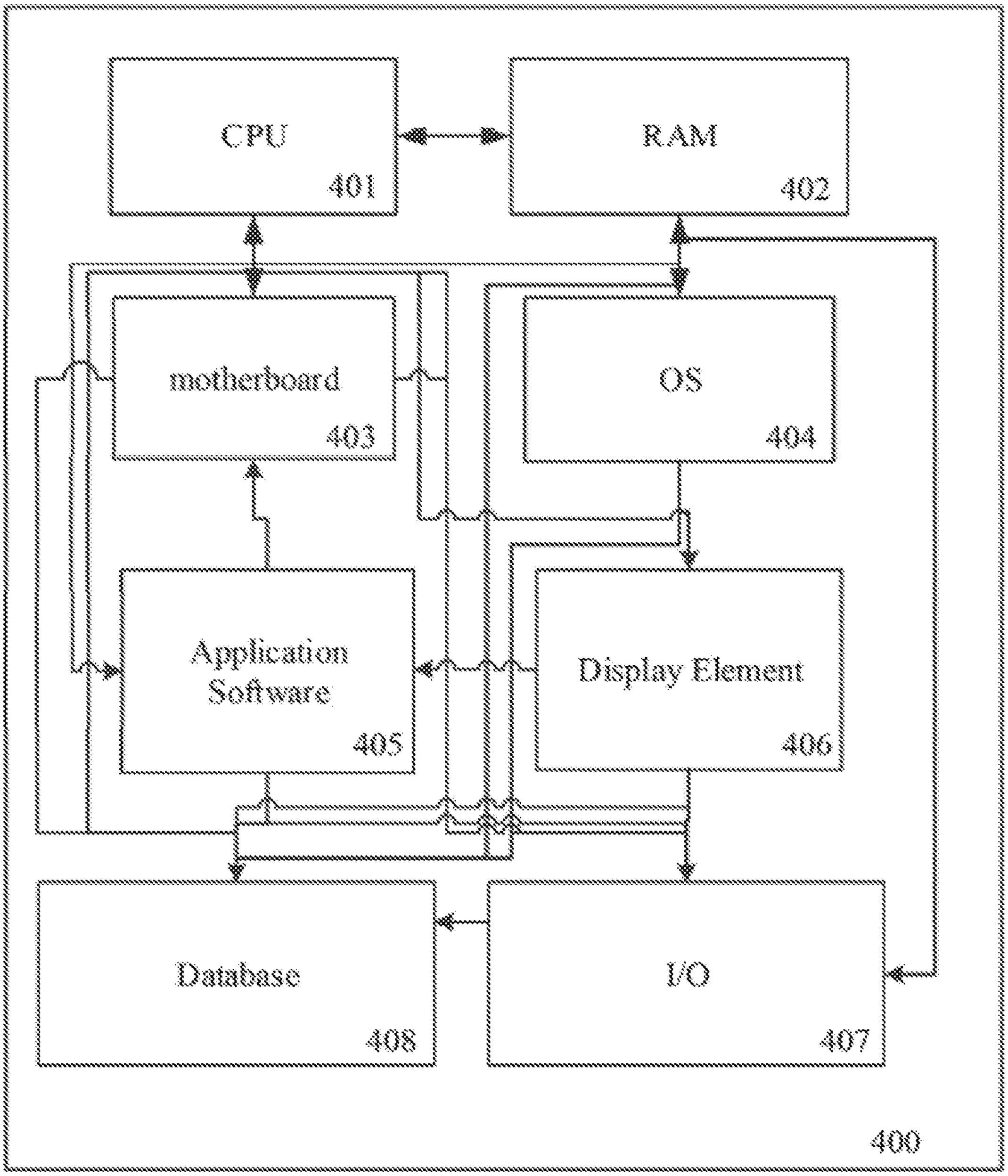
FIG. 4 illustrates a schematic overview of a computing device, in accordance with an embodiment of the present invention.

Turning now to FIG. 4, a schematic overview of a computing device, in accordance with at least some embodiments of the present invention, is shown. As shown in FIG. 4, one of ordinary skill in the art would appreciate that a computing device 400 appropriate for use with embodiments of the present application may generally be comprised of one or more of a Central processing Unit (CPU) 401, Random Access Memory (RAM) 402, a storage medium (e.g., hard disk drive, solid state drive, flash memory, cloud storage) 403, an operating system (OS) 404, one or more application software 405, one or more display elements 406, one or more input/output devices/means 407 and one or more databases 408. Examples of computing devices usable with embodiments of the present invention include, but are not limited to, personal computers, smartphones, laptops, mobile computing devices and tablet PCs. Certain computing devices configured for use with the system do not need all the components described in FIG. 4. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 5:
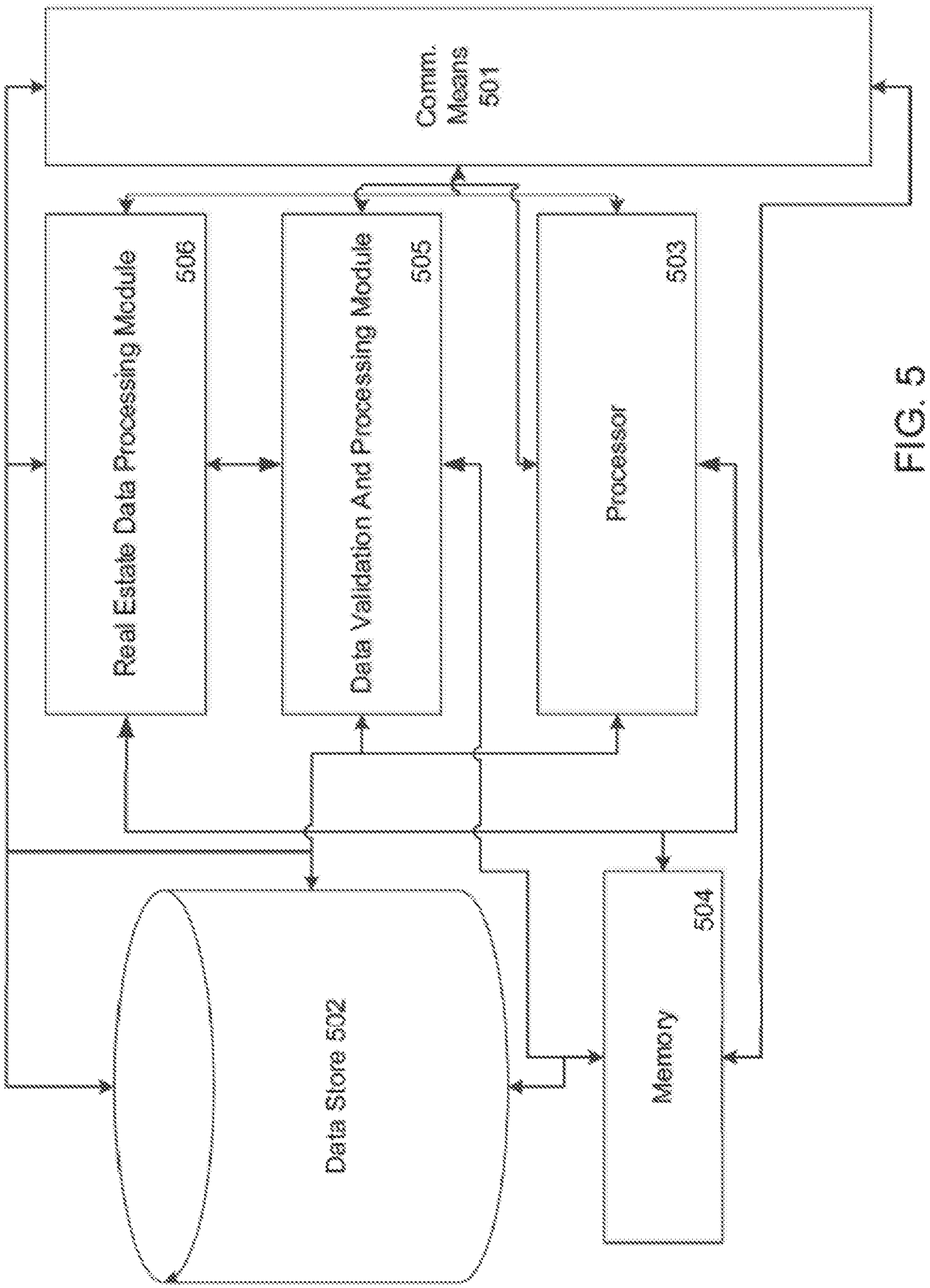
FIG. 5 illustrates a schematic overview of an embodiment of a system for the aggregation and graduated visualization of real estate development and construction cost and risk management.
Figure 6:
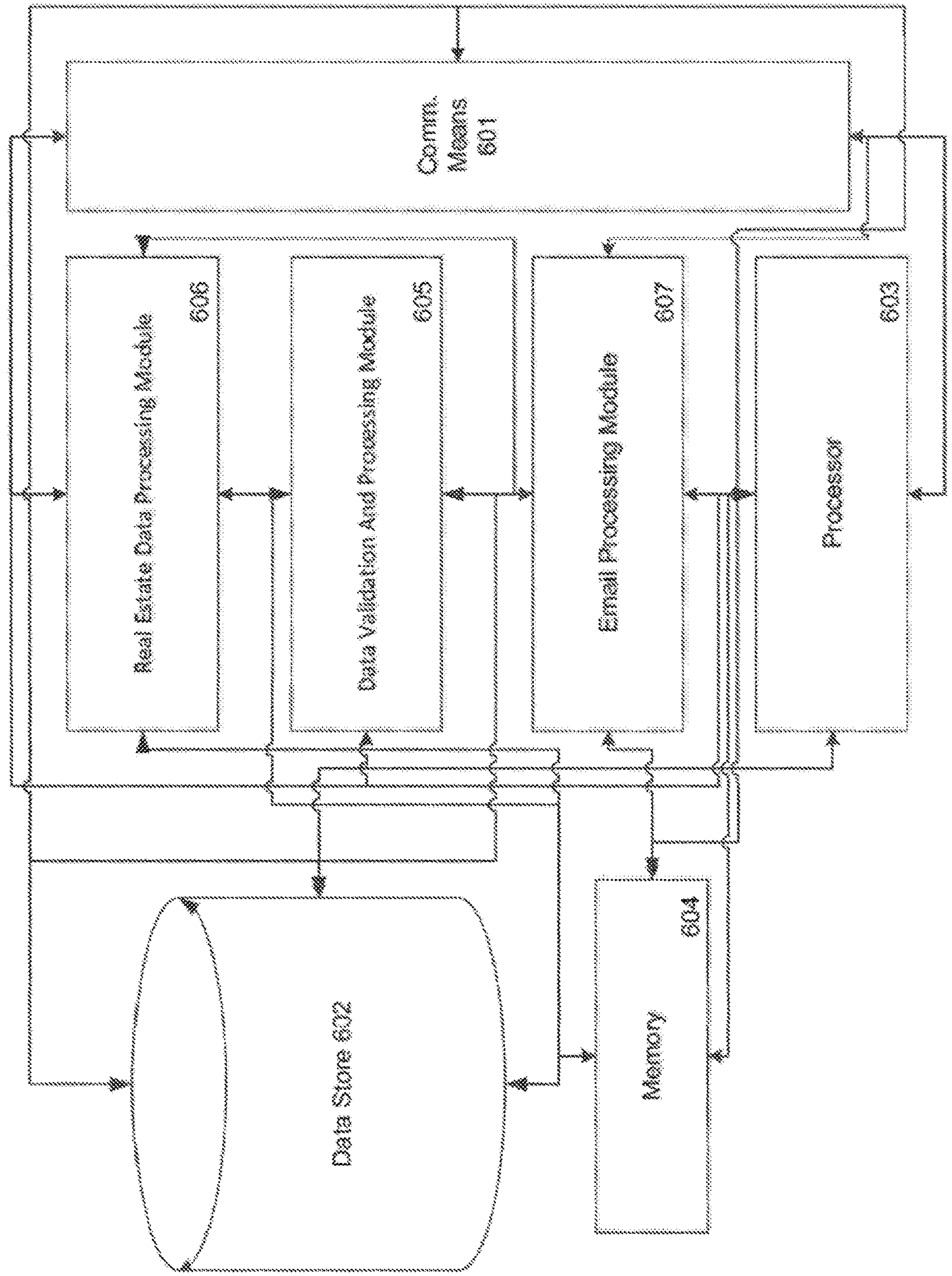
FIG. 6 illustrates a schematic overview of an embodiment of a system for the aggregation and graduated visualization of user generated social post on a social mapping network.

Turning to FIG. 5, according to at least some embodiments of the present invention, a system for a real estate and construction cost application implementing 3d graphical user interfaces and interactions is comprised of one or more communications means 501, one or more data stores 502, a processor 503, memory 504, a real estate data processing module 505 and a data validation and processing module 506. FIG. 6 shows an alternative embodiment of the present invention, comprised of one or more communications means 601, one or more data stores 602, a processor 603, memory 604, a real estate data processing module 605 and a data validation and processing 606 and an email processing module 607. The various modules described herein provide functionality to the system, but the features described and functionality provided may be distributed in any number of modules, depending on various implementation strategies. One of ordinary skill in the art would appreciate that the system may be operable with any number of modules, depending on implementation, and embodiments of the present invention are contemplated for use with any such division or combination of modules as required by any particular implementation. In alternate embodiments, the system may have additional or fewer components. One of ordinary skill in the art would appreciate that the system may be operable with a number of optional components, and embodiments of the present invention are contemplated for use with any such optional component.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

Figure 7:
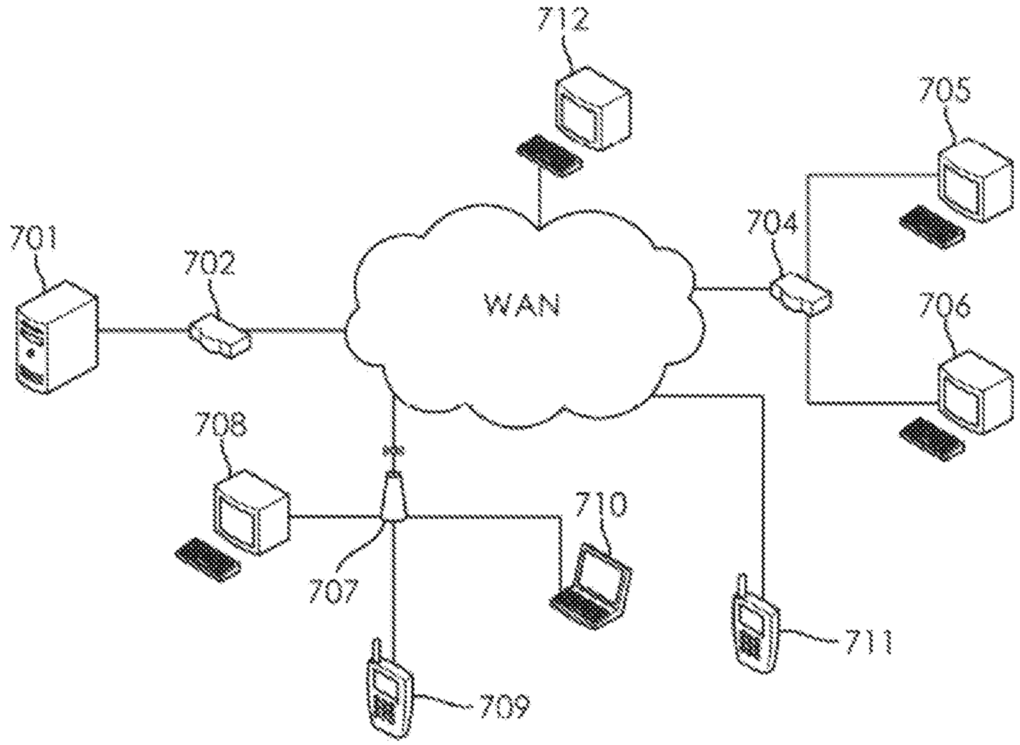
FIG. 7 is an illustration of a network diagram for a cloud-based portion of the system, in accordance with an embodiment of the present invention.

Referring to FIG. 7, a schematic overview of a cloud-based system that interacts with the system is shown. The cloud-based system is comprised of one or more application servers 703 for electronically storing information used by the system. Applications in the application server 203 may retrieve and manipulate information in storage devices and exchange information through a Network 701 (e.g., the Internet, a LAN, WiFi, Bluetooth, etc.). Applications in server 703 may also be used to manipulate information stored remotely and process and analyze data stored remotely across a Network 701 (e.g., the Internet, a LAN, WiFi, Bluetooth, etc.).

According to an exemplary embodiment, as shown in FIG. 7, exchange of information through the Network 701 may occur through one or more high speed connections. In some cases, high speed connections may be over-the-air (OTA), passed through networked systems, directly connected to one or more Networks 701 or directed through one or more routers 702. Router(s) 702 are completely optional and other embodiments in accordance with the present invention may or may not utilize one or more routers 702. One of ordinary skill in the art would appreciate that there are numerous ways server 703 may connect to Network 701 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 703 via Network 701 or other network in numerous ways. For instance, a component may connect to the system i) through a computing device 712 directly connected to the Network 701, ii) through a computing device 705, 706 connected to the WAN 701 through a routing device 704, iii) through a computing device 708, 709, 710 connected to a wireless access point 707 or iv) through a computing device 711 via a wireless connection (e.g., CDMA, GMS, 3G, 4G) to the Network 701. One of ordinary skill in the art would appreciate that there are numerous ways that a component may connect to server 703 via Network 701, and embodiments of the present invention are contemplated for use with any method for connecting to server 703 via Network 701. Furthermore, server 703 could be comprised of a personal computing device, such as a smartphone, acting as a host for other computing devices to connect to.

Figure 8:
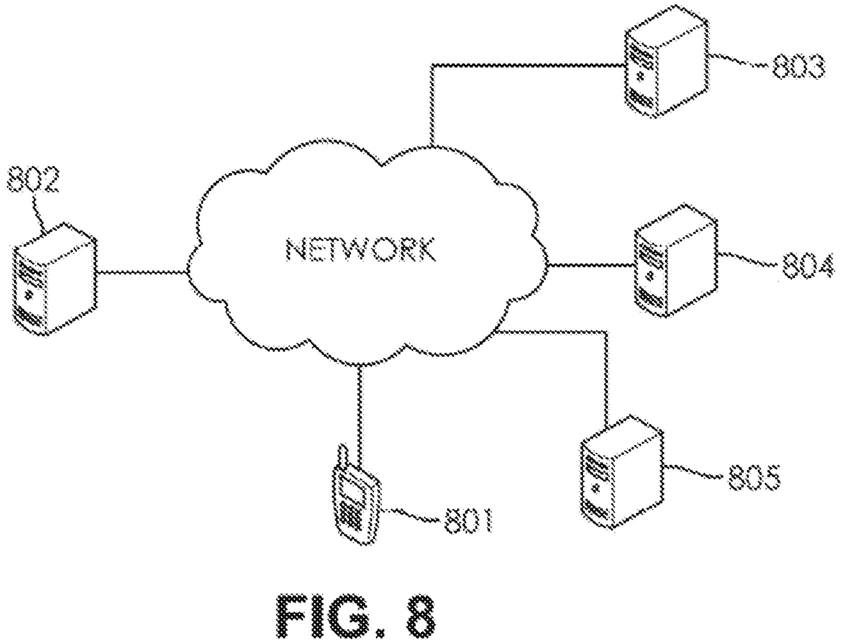
FIG. 8 is an illustration of a network diagram for a cloud-based portion of the system, in accordance with an embodiment of the present invention.

Turning now to FIG. 8, a continued schematic overview of a cloud-based system in accordance with an embodiment of the present invention is shown. In FIG. 8, the cloud-based system is shown as it may interact with users and other third party networks or APIs. For instance, a user of a mobile device 801 may be able to connect to application server 802. Application server 802 may be able to enhance or otherwise provide additional services to the user by requesting and receiving information from one or more of an external content provider API/website or other third party system 803, a constituent data service 804, one or more additional data services 805 or any combination thereof. Additionally, application server 802 may be able to enhance or otherwise provide additional services to an external content provider API/website or other third party system 803, a constituent data service 804, one or more additional data services 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A real estate development and construction cost and risk management system, comprising:

a real estate development and construction cost and risk management module, comprising computer-executable code stored in non-volatile memory; and a computer processor;

wherein the real estate development and construction cost and risk management module and the computer processor are configured to:

receive at an email address an invoice data flow, a commitments data flow, and a budget transactions data flow;

identify data in each data flow by the real estate development and construction cost and risk management module using optical character recognition or image recognition utilizing machine learning, the data including metadata associated with at least one of: (i) an invoice vendor, (ii) a user identification, (iii) a project identification, or (iv) a transaction vendor, associate each data flow with a data set based on the metadata, and extract a data subset from the data identified in the invoice data flow, the commitments data flow, and the budget transactions data flow, the data subset including at least one of: (i) an invoice amount, (ii) a due date, or (iii) a project status update;

update the data set using the data subset;

determine, after updating the data set, that the data set includes an anomaly comprising a duplicate data entry or an out-of-place data entry;

eliminate the anomaly by at least one of: (i) removing the duplicate data entry or the out-of-place data entry from the data set, (ii) flagging the duplicate data entry or the out-of-place data entry for user review, or (iii) correcting the duplicate data entry or the out-of-place data entry; and in response to a trigger event occurrence, the trigger event including exceeding a threshold value associated with a data set value, automatically generate a draw request using the data set updated with the data subset.

2. The real estate development and construction cost and risk management system of claim 1, wherein the real estate development and construction cost and risk management module and the processor are further configured to generate a plurality of reports using the data set updated with the data subset.

3. The real estate development and construction cost and risk management system of claim 2, wherein the plurality of reports includes a first report and a second report, and updating a first data of the first report causes an update of a second data of the second report, wherein the first data and the second data are equal to a same data of the data set.

4. The real estate development and construction cost and risk management system of claim 2, wherein the real estate development and construction cost and risk management module and the processor are further configured to:

generate an alert in response to generating the plurality of reports using the data set updated with the data subset; and notify one or more users associated with the plurality of reports.

5. The real estate development and construction cost and risk management system of claim 1, wherein the real estate development and construction cost and risk management module and the processor, are configured to receive, at the email address, an insurance data flow and a lien waiver data flow.

6. The real estate development and construction cost and risk management system of claim 5, wherein the real estate development and construction cost and risk management module and the processor, are further configured to receive, at the email address, a tax document data flow.

7. The real estate development and construction cost and risk management system of claim 1, further comprising a communication device, and wherein the real estate development and construction cost and risk management module, the computer processor, and a communication device are configured to:

identify an email sender; and store an email address of the email sender and metadata associated with the email address.

8. The real estate development and construction cost and risk management system of claim 7, wherein the real estate development and construction cost and risk management module, the computer processor, and the communication device are configured to identify the email sender by processing email data.

9. The real estate development and construction cost and risk management system of claim 1, further comprising a communication device, wherein the real estate development and construction cost and risk management module, the computer processor, and a communication device are configured to associate the data subset with a project based on information from email metadata or text included in an email received at the email address.

10. The real estate development and construction cost and risk management system of claim 9, wherein the real estate development and construction cost and risk management module, the computer processor, and the communication device are further configured to associate the data subset with a project based on information from a recipient or sender email address or an attachment attached to the email.

11. The real estate development and construction cost and risk management system of claim 1, wherein receiving the invoice data flow, the commitments data flow, and the budget transactions data flow includes using a communication device to receive data included in a data packet selected from the group consisting of an email, a text, an SMS, and an application programming interface.

12. The real estate development and construction cost and risk management system of claim 1, wherein the trigger event further includes at least one of (i) available capital and working capital requirements, or (ii) elapsing of a time period corresponding to the data set.

13. The real estate development and construction cost and risk management system of claim 1, wherein identifying data in each data flow by the real estate development and construction cost and risk management module includes using Boolean comparison and regular expressions to search for patterns and matches.

14. The real estate development and construction cost and risk management system of claim 1, wherein determining that the data set includes an anomaly includes using artificial intelligence and/or machine learning techniques.

15. The real estate development and construction cost and risk management system of claim 2, wherein the real estate development and construction cost and risk management module and the processor are further configured to update, after eliminating the anomaly, the plurality of reports.

16. A real estate development and construction cost and risk management method, comprising:

receiving, by one or more processors at an email address an invoice data flow, a commitments data flow, and a budget transactions data flow;

identifying data in each data flow by a real estate development and construction cost and risk management module implemented by the one or more processors, the real estate development and construction cost and risk management module using optical character recognition or image recognition utilizing machine learning, and the data including metadata associated with at least one of: (i) an invoice vendor, (ii) a user identification, (iii) a project identification, or (iv) a transaction vendor;

associating, by the one or more processors, each data flow with a data set based on the metadata;

extracting, by the one or more processors, a data subset from the data identified in the invoice data flow, the commitments data flow, and the budget transactions data flow, the data subset including at least one of: (i) an invoice amount, (ii) a due date, or (iii) a project status update;

updating, by the one or more processors, the data set using the data subset;

after updating the data set, determining, by the one or more processors, that the data set includes an anomaly comprising a duplicate data entry or an out-of-place data entry;

eliminating, by the one or more processors, the anomaly by at least one of: (i) removing the duplicate data entry or the out-of-place data entry from the data set, (ii) flagging the duplicate data entry or the out-of-place data entry for user review, or (iii) correcting the duplicate data entry or the out-of-place data entry; and in response to a trigger event occurrence, the trigger event including exceeding a threshold value associated with a data set value, automatically generating, by the one or more processors, a draw request using the data set updated with the data subset.

17. A non-transitory computer-readable medium, having stored thereon computer-readable instructions that when executed, cause one or more processors to:

receive at an email address an invoice data flow, a commitments data flow, and a budget transactions data flow;

identify data in each data flow by the real estate development and construction cost and risk management module using optical character recognition or image recognition utilizing machine learning, the data including metadata associated with at least one of: (i) an invoice vendor, (ii) a user identification, (iii) a project identification, or (iv) a transaction vendor;

associate each data flow with a data set based on the metadata;

extract a data subset from the data identified in the invoice data flow, the commitments data flow, and the budget transactions data flow, the data subset including at least one of: (i) an invoice amount, (ii) a due date, or (iii) a project status update;

update the data set using the data subset;

determine, after updating the data set, that the data set includes an anomaly comprising a duplicate data entry or an out-of-place data entry;

eliminate the anomaly by at least one of: (i) removing the duplicate data entry or the out-of-place data entry from the data set, (ii) flagging the duplicate data entry or the out-of-place data entry for user review, or (iii) correcting the duplicate data entry or the out-of-place data entry; and in response to a trigger event occurrence, the trigger event including exceeding a threshold value associated with a data set value, automatically generate a draw request using the data set updated with the data subset.

* * * * *